United States Patent

[11] 3,588,167

| [72] | Inventors | John W. Ratcliff;<br>Rudy J. Ratcliff, Marengo, Ill. |
|---|---|---|
| [21] | Appl. No. | 809,699 |
| [22] | Filed | Mar. 24, 1969 |
| [45] | Patented | June 28, 1971 |
| [73] | Assignee | Ratcliff Industries, Inc.<br>Marengo, Ill. |

[54] FRAME CONSTRUCTION FOR A TELESCOPIC TRAILER
5 Claims, 3 Drawing Figs.

[52] U.S. Cl. ................................................. 296/27, 52/66
[51] Int. Cl. ...................................................... B60p 3/34
[50] Field of Search............................................ 296/23, 23.3, 26, 27; 52/66

[56] References Cited
UNITED STATES PATENTS
2,862,759 12/1958 Huth ............................. 296/23.3
3,380,507 4/1968 Bontrager...................... 296/27
2,944,852 7/1960 Snyder .......................... 296/23X

*Primary Examiner*—Philip Goodman
*Attorney*—Andrus, Sceales, Starke and Sawall

ABSTRACT: A frame construction for a telescopic trailer. The trailer includes a lower trailer section and an upper trailer section is mounted for telescopic movement between an upper dwelling position and a lower transporting position.

The lower trailer section includes a frame member and a vertical wall is supported on the frame member and spaced from both the inner and outer edges of the frame member. A floor extends across the lower trailer section and is supported on the inner edge portion of the frame member.

The upper trailer section includes a vertical wall and when the upper trailer section is in the transporting position, the lower edge of the vertical wall of the upper trailer section is adapted to rest on the outer edge portion of the frame member.

PATENTED JUN28 1971

3,588,167

INVENTORS
JOHN W. RATCLIFF
RUDY J. RATCLIFF

BY

Attorneys

FRAME CONSTRUCTION FOR A TELESCOPIC TRAILER

This invention relates to a telescopic travel trailer and more particularly to a frame construction for a telescopic travel trailer.

The conventional telescopic trailer includes a lower trailer section and an upper trailer section which is adapted to be raised and lowered with respect to the lower section, so that the upper trailer section can be moved between a lower transporting position and an upper dwelling position. By lowering the upper trailer section for transporting, the wind resistance is reduced and the center of gravity is lowered to eliminate dangerous sway during transporting.

The present invention is directed to an improved frame construction for a telescopic travel trailer. The lower trailer section includes a frame member and the vertical wall of the lower trailer section is supported on the frame member and spaced from both the inner and outer edges of the frame member. Supported on the exposed inner edge portion of the frame member is a floor which extends across the lower trailer section.

The upper trailer section includes a vertical wall which is located outwardly of the vertical wall of the lower trailer section. When the upper trailer section is in its lowered transporting position, the lower edge of the vertical wall rests on the exposed outer side edge portion of the frame member. A flexible or resilient sealing element is connected to the lower edge of the vertical wall and provides a seal between the frame member and the upper trailer section when the upper trailer section is in the transporting position.

As the frame itself supports the upper trailer section in the transporting position a more stable support is provided for the upper trailer section when it is in the lowered or transporting position and eliminates the necessity of attaching auxiliary stops or supports on the lower trailer section as in conventional telescopic trailer constructions.

In the lowered or transporting position, the frame encloses the joint between the two trailer section, thereby preventing the entry of dirt, dust and moisture in the joint between the sections when in transit.

Other objects and advantages will appear in the course of the following description.

The drawings illustrate the best mode presently contemplated of carrying out the invention.

Figure 1:
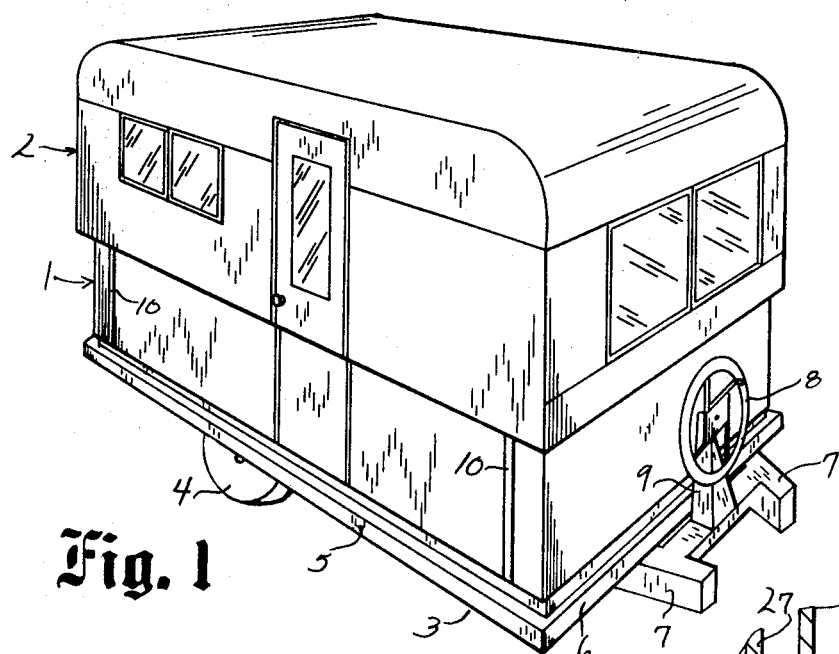
FIG. 1 is a perspective view of a telescopic travel trailer incorporating the invention.

The drawings illustrate a travel trailer which comprises a lower trailer section 1 and an upper trailer section 2 which can be raised and lowered with respect to the lower section. FIG. 1 illustrates the upper trailer section in the upper or dwelling position, and for transporting, the upper trailer section can be lowered to thereby minimize wind resistance and lower the center of gravity of the trailer.

The lower trailer section comprises a frame 3 which is supported on wheels 4 and the frame 3 includes a pair of generally channel-shaped side members 5 which are connected at their ends by cross members 6. In addition, a pair of longitudinal beams 7 extend the length of the trailer and the forward ends of the beams 7 are connected together and provide a towing connection for the trailer.

The upper trailer section can be raised and lowered by a mechanism similar to that described in the copending U.S. Pat. application Ser. No. 705,396 filed Feb. 14, 1968. The mechanism for raising and lowering the upper trailer section as disclosed in the aforementioned patent application is operated by manually rotating a wheel 8 which is journaled on a vertical column 9 carried by beams 7 and rotating of the wheel operates through a cable arrangement to raise and lower the upper trailer section 2 with respect to the lower section.

To guide the upper trailer section in telescopic movement, a pair of guide tracks 10 are attached to each side wall of the lower trailer section and rollers, not shown, carried by the upper trailer section 2 ride in the guide tracks 10 as the upper trailer section is telescoped.

Figure 3:
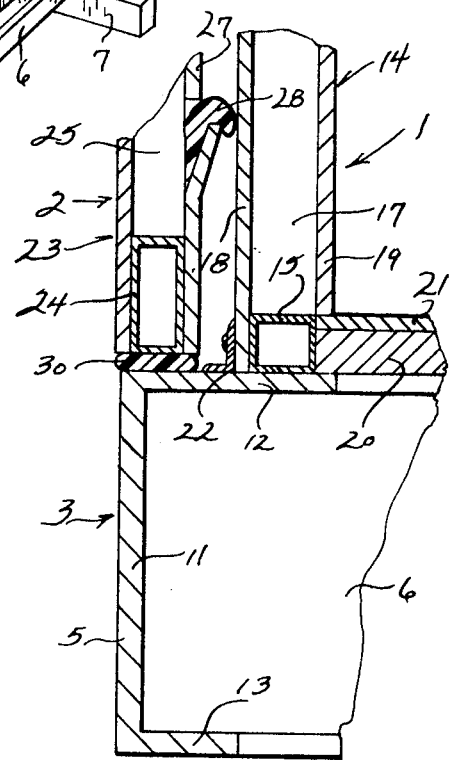
FIG. 3 is a view similar to FIG. 2 showing the upper trailer section in the lowered transporting position.
Figure 2:
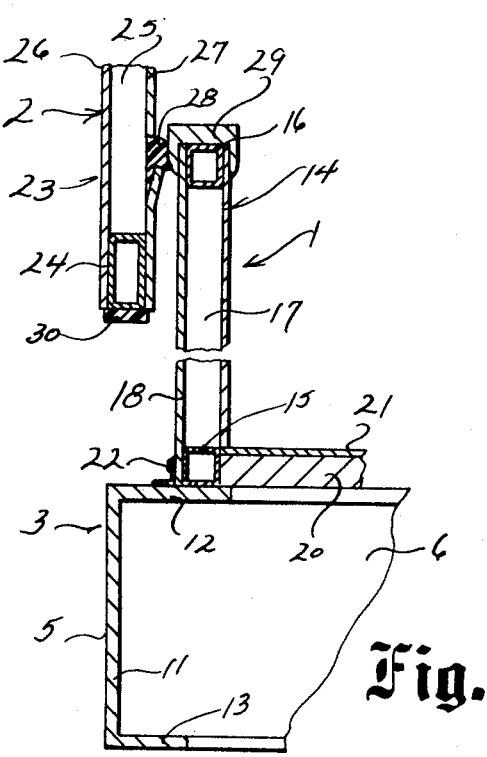
FIG. 2 is a fragmentary vertical section with parts broken away in section showing the upper trailer section in the upper, or dwelling position.

As best shown in FIGS. 2 and 3, the side members 5 and end members 6 are channel shaped in cross section and include a vertical web portion 11, an upper flange 12 and a lower flange 13. The vertical side and end walls 14 of the lower trailer section are supported on the upper flanges 12 of the respective side members 5 and end members 6. The vertical walls of the lower trailer section include a base member 15 and an upper member 16 which are connected together by a series of vertical studs 17. The members 15, 16 and 17 can be formed of metal having a generally box-shaped cross section, or alternately, they can be formed of wood or other structural material.

Secured to the outer surface of the members 15, 16 and 17 is an outer skin 18 which may be formed of aluminum, plastic, wood, or the like, and similarly, an inner wall surface 19 is secured to the inner surface of the members 15, 16 and 17.

In accordance with the invention, the base member 15 of the vertical wall 14 is spaced from both the outer side edge and the inner side edge of the upper flange 12 of members 5 and 6. A floor 20 formed of plywood or other materials is supported on the exposed inner edge portion of the upper flange 12 of members 5 and 6, as well as on the upper surface of the beams 7. A suitable floor covering 21 is applied to the floor 20.

To seal the joint between the base member 15 and the upper surface of the members 5 and 6, a molding strip 22 is secured to the base member.

The vertical side and end walls 23 of the upper trailer section 2 are constructed in a manner similar to that of the lower trailer section, and each vertical wall 23 includes a lower horizontal member 24, and a series of vertical studs 25 are secured at intervals to the lower member 24. The wall 23 of the upper trailer section also includes an outer skin 26, similar to skin 18, and an inner wall surface 27 similar to wall surface 19.

To seal the space between the wall 14 of the lower trailer section and the wall 23 of the upper trailer section 2, a sealing strip 28 is secured to the inner surface of the wall 23 and is adapted to engage the wall 23. When the upper trailer section is raised to the dwelling position, the sealing strip 28 is engaged and is compressed against a tapered surface on a plastic cap 29 secured to the upper edge of the wall 14 of the lower trailer section 1. Engagement of the sealing strip 28 with the cap 29 provides a seal between the upper and lower trailer sections.

When the upper trailer section 2 is lowered to the transporting position, the lower edge of the walls 23 of the upper trailer section are adapted to rest on the exposed outer side edge portion of flange 12 of the side members 5 and cross members 6, as shown in FIG. 3. Attached to the lower end of the wall 23 of the upper trailer section is a flexible or resilient sealing member 30 which is compressed and serves to seal the joint between the upper trailer section 2 and the frame members 5 and 6 when the upper trailer section is lowered to the transporting position.

As the side members 5 and end members 6 of the frame support the upper trailer section 2 in the lowered or transporting position, a more stable support is provided for the upper trailer section and this also eliminates the necessity of attaching auxiliary stops or supports on the lower trailer section which are ordinarily necessary in a conventional telescopic trailer to limit the downward movement of the upper trailer section.

As a further and important advantage, the flange 12 of the frame members encloses the joint between the walls 14 and 23 when the upper trailer section is in the lowered or transporting position as shown in FIG. 3. By enclosing the joint, entry of dirt, moisture and foreign material is prevented during transit.

While the drawings show the lower edge of the vertical walls 23 of the upper trailer section being supported on the exposed outer portion of the frame members 5 and 6, it is contemplated that in some instances the upper trailer section can be supported on only one or both of the side members 5 or the end members 6.

We claim:

1. In a telescopic travel trailer, a generally rectangular structural frame supported on wheels, said frame being generally channel-shaped in cross section and including a vertical web and an inwardly extending horizontal flange, a lower trailer section including a generally rectangular vertical wall supported on the horizontal flange and spaced from both the inner and outer edges of said flange to provide an exposed outer edge portion and an exposed inner edge portion, a floor supported on the inner edge portion of said flange, an upper trailer section disposed for telescopic movement with respect to the lower section and movable between a lower transporting position and an upper camping position, said upper trailer section including a generally rectangular vertical wall located laterally outward of the vertical wall of the lower trailer section and having a lower edge, said lower edge disposed to rest on the outer edge portion of said flange when the upper trailer section is in the lower transporting position, and flexible sealing means carried by said lower edge and being substantially coextensive with said lower edge, said sealing means disposed to engage the outer portion of said flange to seal the joint between said lower edge and said frame when the upper trailer section is in the lower transporting position.

2. In a telescopic trailer, a lower trailer section including a structural frame member supported on wheels and having a generally horizontal upper surface, said lower trailer section also including a first generally vertical wall section supported on said upper surface and spaced from both the inner and outer edges of said surface to provide an exposed outer edge portion and an exposed inner edge portion, a floor supported on the inner edge portion of said upper surface, an upper trailer section disposed for telescopic movement with respect to the lower section and movable between a lower transporting position and an upper dwelling position, said upper trailer section including a second generally vertical wall section located laterally outward of said first wall section and having a lower edge, said lower edge disposed to rest on the outer edge portion of said surface when the upper trailer section is in the lower transporting position, and sealing means for sealing the joint between said lower edge and the outer edge portion of said surface when the upper trailer section is in the lower transporting position.

3. The structure of claim 2, wherein said sealing means is carried by said lower edge.

4. The structure of claim 2, and including second sealing means for sealing the joint between the first wall section and the second wall section when the upper trailer section is in the upper position.

5. The structure of claim 2, and including means for raising and lowering the upper trailer section with respect to the lower trailer section.